(12) United States Patent
Tosten et al.

(10) Patent No.: US 11,741,851 B2
(45) Date of Patent: Aug. 29, 2023

(54) COGNITIVE AID DEVICE AND METHOD FOR ASSISTING

(71) Applicant: GETTYSBURG COLLEGE, Gettysburg, PA (US)

(72) Inventors: Rodney S. Tosten, Gettysburg, PA (US); Roger Nelson, Gettysburg, PA (US); Waldemar Hogerwaard, Wouwse Plantage (NL); Olivia Young, Orrtanna, PA (US)

(73) Assignee: GETTYSBURG COLLEGE, Gettysburg, PA (US)

( * ) Notice: Subject to any disclaimer, the term of this patent is extended or adjusted under 35 U.S.C. 154(b) by 456 days.

(21) Appl. No.: 16/918,558

(22) Filed: Jul. 1, 2020

(65) Prior Publication Data

US 2021/0005101 A1 Jan. 7, 2021

Related U.S. Application Data

(60) Provisional application No. 62/869,621, filed on Jul. 2, 2019.

(51) Int. Cl.
*G09B 19/00* (2006.01)
*A63H 3/00* (2006.01)
(Continued)

(52) U.S. Cl.
CPC .............. *G09B 19/00* (2013.01); *A63H 3/003* (2013.01); *A63H 3/02* (2013.01); *G09B 19/003* (2013.01); *A63H 3/28* (2013.01)

(58) Field of Classification Search
CPC ...... G09B 19/00; G09B 19/003; A63H 3/003; A63H 3/02
See application file for complete search history.

(56) References Cited

U.S. PATENT DOCUMENTS 4,710,145 A 12/1987 Vandis
5,197,885 A 3/1993 Friedel
(Continued)

FOREIGN PATENT DOCUMENTS

JP 2002172274 A 1/2004
JP 2009012148 A 1/2009
(Continued)

*Primary Examiner* — Xuan M Thai
*Assistant Examiner* — Sadaruz Zaman
(74) *Attorney, Agent, or Firm* — McNees Wallace & Nurick LLC

(57) ABSTRACT

A cognitive aid device is disclosed, including a shell configured as a plush toy and a management system located at least partially within the shell. The management system includes a control module, a position module, a communication module, a proximity module, and an audio/visual (A/V) module. The cognitive aid device is arranged and configured to execute the instructions, and executing the instructions includes the cognitive aid device prompting an individual using the cognitive aid to perform an exercise or other cognitive movement routine described by the cognitive aid device, monitoring the individual, processing data received, and providing responsive stimulus to the individual indicating successful completion of the exercise or other cognitive movement routine or further prompting the individual to perform the exercise or other cognitive movement routine. A method for assisting an individual with the exercise or other cognitive movement routine is disclosed including providing the cognitive aid device.

20 Claims, 1 Drawing Sheet

(51) Int. Cl.
*A63H 3/02* (2006.01)
*A63H 3/28* (2006.01)

(56) References Cited

U.S. PATENT DOCUMENTS

| | | | |
|---|---|---|---|
| 5,376,038 A | 12/1994 | Arad et al. | |
| 6,890,239 B2 | 5/2005 | Kopelle | |
| 8,849,697 B2* | 9/2014 | Tropper | G06Q 30/0264 |
| | | | 600/300 |
| 10,118,696 B1* | 11/2018 | Hoffberg | B64C 39/001 |
| 10,188,957 B2* | 1/2019 | Teel | A63H 3/28 |
| 10,252,145 B2* | 4/2019 | Tran | G06V 40/28 |
| 10,650,693 B2* | 5/2020 | Cavallo | G09B 19/003 |
| 11,559,252 B2* | 1/2023 | Burwinkel | G06F 3/012 |
| 11,586,188 B2* | 2/2023 | Cella | H04L 1/1874 |
| 2009/0055019 A1* | 2/2009 | Stiehl | B25J 9/1671 |
| | | | 901/17 |
| 2010/0121789 A1* | 5/2010 | Bednyak | G09B 19/00 |
| | | | 706/11 |
| 2011/0028067 A1 | 2/2011 | Forks et al. | |
| 2012/0308973 A1 | 12/2012 | Marsac et al. | |
| 2013/0078600 A1* | 3/2013 | Fischer | G09B 19/00 |
| | | | 434/236 |
| 2013/0216989 A1* | 8/2013 | Cuthbert | A61B 5/1113 |
| | | | 434/238 |
| 2016/0005320 A1* | 1/2016 | deCharms | G09B 19/00 |
| | | | 434/236 |
| 2017/0050117 A1 | 2/2017 | Guiliano | |
| 2017/0113151 A1 | 4/2017 | Smith | |
| 2017/0209796 A1 | 7/2017 | Kim et al. | |
| 2018/0117479 A1* | 5/2018 | Coolidge | G09B 5/00 |
| 2018/0161685 A1* | 6/2018 | Garren | G09B 19/00 |
| 2019/0073915 A1* | 3/2019 | Bell | G06F 3/167 |
| 2019/0077007 A1 | 3/2019 | Mallinson | |
| 2019/0172571 A1* | 6/2019 | Ramaci | G16H 20/30 |
| 2020/0294407 A1* | 9/2020 | Tillman, Sr. | G09B 1/16 |
| 2021/0005101 A1* | 1/2021 | Tosten | G09B 19/00 |

FOREIGN PATENT DOCUMENTS

| | | |
|---|---|---|
| JP | 2018117821 A | 12/2019 |
| WO | 016572 A1 | 9/2001 |

* cited by examiner

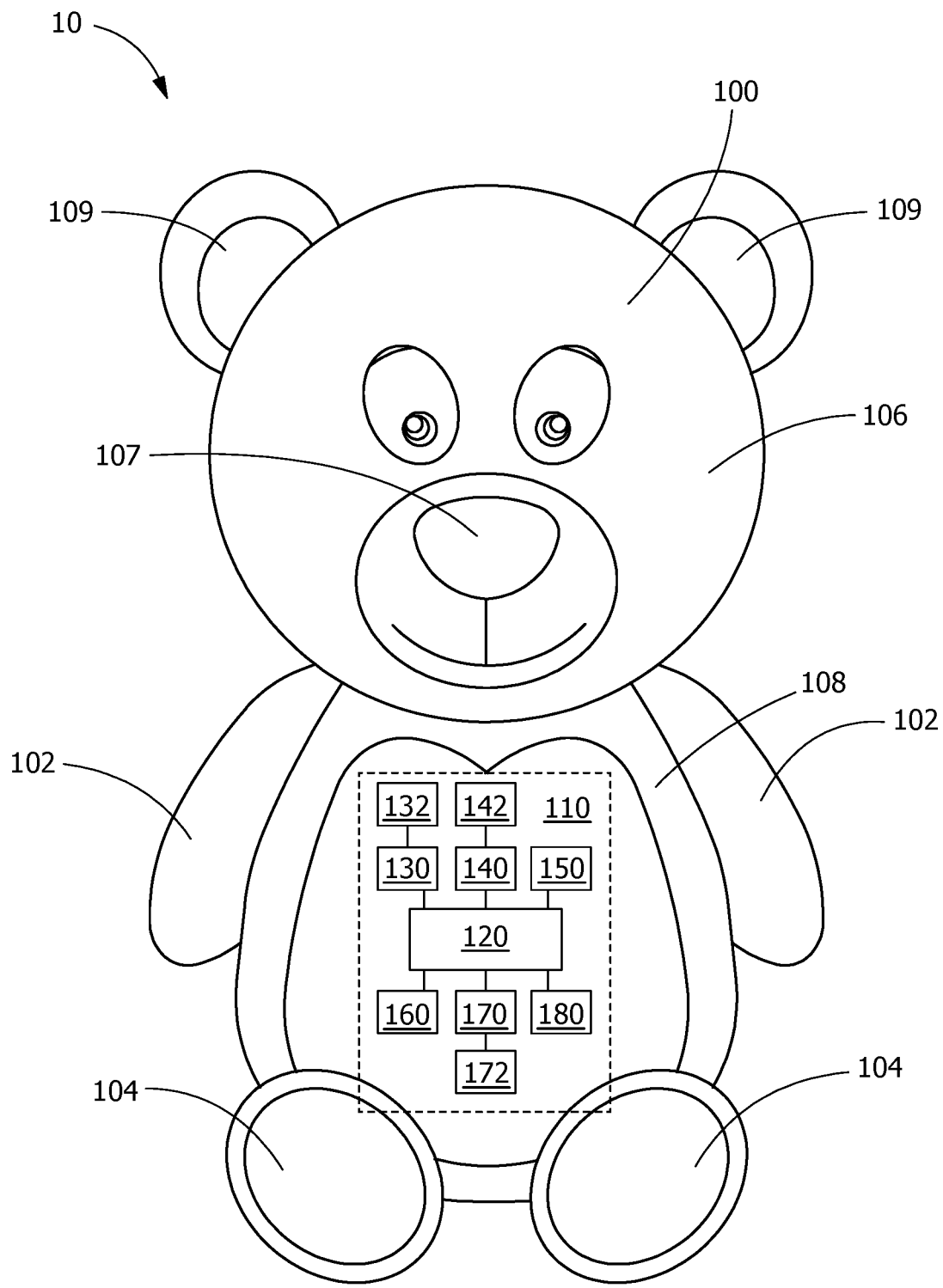

COGNITIVE AID DEVICE AND METHOD FOR ASSISTING

RELATED APPLICATIONS

This application claims the benefit of and priority to U.S. Prov. App. No. 62/869,621, filed Jul. 2, 2019, which is hereby incorporated by reference in its entirety.

FIELD OF THE INVENTION

This application is directed to a cognitive aid device. More specifically, this application is directed to a cognitive aid device which provides reasoning, emotional and physical stimulus for individuals experiencing cognitive decline.

BACKGROUND OF THE INVENTION

As the population ages, an increasing number of individuals experiencing mental decline are receiving specialized care options. A high percentage of individuals receiving these special care options have memory disorders that are often associated with dementia. Approximately 50 million individuals in the United States of America are living with some form of a memory disorder. There is an immediate level of concern among family members charged with caring for a loved one experiencing the effects of dementia.

Dementia signs and symptoms include a gradual loss of cognitive abilities and a concomitant decrease in coordinated movement of the limbs and balance disorders that relate to a gradual decrease in the ability to walk unaided in a safe manner and feed oneself at meal time. Regular physical activity and cognitive movements may slow the decline in progression in both the cognitive and physical realms. Regular emphasis on cognitive skills and movement symmetry may improve the quality of life for individuals with dementia. While residential memory units within long and short term facilities and in-home visitation services work hard to keep people within their charge active, it is nearly impossible to meet the needs of every person. The ability of caregivers to oversee a movement routine for individual residents is limited by their availability and knowledge of what the best approach might be to help with movement and cognition. Consequently, many residents forget to perform their movement routines and experience reduced function and interactive cognitive functions. Quality of life measures tend to decrease as the manifestations of the memory disorder become more apparent to the family of the resident.

Additionally, memory deficient individuals have a deep retention of a loved one's voice. When a family member comes to visit, that individual usually perks up and becomes more animated in their verbal skills and in their physical movements of limbs. They tend to walk with their family member and discuss times past.

U.S. Patent Application Publication No. 2017/0113151 A1 describes an interactive figure comprising an interaction module to interact with users and remotely interact with other communications devices and persons remote from the interactive figure. Intended for use with individuals having autism, dementia, post-traumatic stress disorder, Alzheimer's disease, and other neurological conditions, the interactive figure may provide visual stimuli, aural stimuli, and verbal communication, and may measure actions of the individual. However, the interactive figure does not include the capability to provide instructions to the individual, measure the individual's compliance with the instructions, and respond accordingly. The interactive figure is not adaptive to the behavior of the individual in its autonomous mode, and is directed to comfort therapy only. No specific mechanism for remotely adapting the interactive figure to a particular behavior of the individual is disclosed. The interactive figures further lacks any means for physical stimulus, biometric monitoring, measuring footsteps (a pedometer) or measuring position (GPS).

Japanese Patent Application Publication No. JP2002172274A describes a therapy toy for use with individuals having dementia. This therapy toy generates voice messages at pre-set times of the day to reinforce a sense of the passage of time, with the messages changing according to the month or season to further ground the individual's sense of time. The therapy toy measures verbal responses to the messages to ensure that the individual is aware of the messages; however, the therapy toy does not measure whether the messages were complied with. The therapy toy is not adaptive to the behavior of the individual. No specific mechanism for remotely adapting the therapy toy to a particular behavior of the individual is disclosed. The therapy toy further lacks any means for physical stimulus, biometric monitoring, measuring footsteps (a pedometer) or measuring position (GPS).

Japanese Patent Application Publication No. JP2018117821A describes a stuffed animal for alleviating loneliness in elderly individuals. The stuffed animal may be used to play recorded music or voice recordings, and may further engage in simulated conversation and provide time-of-day-based reminders. The stuffed animal is not adaptive to the behavior of the individual. No specific mechanism for remotely adapting the stuffed animal to a particular behavior of the individual is disclosed. The stuffed animal further lacks any means for physical stimulus, biometric monitoring, measuring footsteps (a pedometer) or measuring position (GPS).

It would be desirable in the art to have a device capable of assisting an individual with dementia by coaching a movement of body part routine while also allowing a caregiver to monitor the individual's status remotely. It would further be desirable to stimulate that routine in conjunction with encouragement from a familiar voice of a loved one.

BRIEF DESCRIPTION OF THE INVENTION

In one exemplary embodiment, a cognitive aid device includes a shell configured as a plush toy, and a management system located at least partially within the shell. The management system includes a control module including a processor, memory, and instructions encoded in the memory, a position module including one or more position sensors in communication with the control module, a communication module in communication with the control module, a proximity module including one or more proximity sensors in communication with the control module, and an audio/visual (A/V) module in communication with the control module. The cognitive aid device is arranged and configured to execute the instructions, and executing the instructions includes the cognitive aid device prompting an individual using the cognitive aid to perform an exercise or other cognitive movement routine described by the cognitive aid device, monitoring the individual with at least one of the position module, the proximity module, and the A/V module, processing data received from the at least one of the position module, the proximity module, and the A/V module to confirm if and when the individual performs the exercise or other cognitive movement routine, and providing responsive stimulus to the individual indicating successful completion of the exercise or other cognitive movement routine or further prompting the individual to perform the exercise or other cognitive movement routine.

In another exemplary embodiment, a method for assisting an individual with an exercise or other cognitive movement routine includes providing the cognitive aid device described above, prompting the individual using the cognitive aid to perform the exercise or other cognitive movement routine described by the cognitive aid device, monitoring the individual with the at least one of the position module, the proximity module, and the A/V module, processing the data received from the at least one of the position module, the proximity module, and the A/V module to confirm if and when the individual performs the exercise or other cognitive movement routine, and providing the responsive stimulus to the individual indicating successful completion of the exercise or other cognitive movement routine or further prompting the individual to perform the exercise or other cognitive movement routine.

BRIEF DESCRIPTION OF THE DRAWING

The FIGURE is a schematic illustration of a cognitive aid device, according to an embodiment of the present disclosure.

Wherever possible, the same reference numbers will be used throughout the drawings to represent the same parts.

DETAILED DESCRIPTION OF THE INVENTION

Provided is a cognitive aid device 10 for assisting individuals experiencing cognitive decline such as dementia with reasoning, emotional and physical stimulus. The cognitive aid device 10 may also monitor biometric characteristics of the individual and provide data to caregivers and/or family members.

In the example exemplary embodiment shown in the FIGURE, the cognitive aid device 10 is a plush toy 100 configured to appear as a stuffed animal or other keepsake item. The plush toy 100 shown in the FIGURE is configured to appear as a vintage style stuffed bear with arms 102 and legs 104 that swivel 360 degrees. The plush toy 100 additionally includes a management system 110 situated within the plush toy 100 that allows it to perform additional functions. Thus, the plush toy 100 may provide cognitive aid for an individual while simultaneously providing comfort and/or entertainment to that individual.

The management system 110 includes a control module 120 having memory, a processor, and instructions encoded in the memory.

The management system 110 also includes sensors to measure responsiveness of an individual to the cognitive assistance being provided.

In one embodiment, the management system 110 includes a position module 130 having one or more position sensors 132 in communication with the control module 120 that monitor the location and movement of the plush toy 100. The position sensors 132 of the position module 130 may include an accelerometer, pedometer, magnetometer, barometer, altimeter, and/or gyro meter which are configured to monitor one or more of the orientation, speed, and/or acceleration of the plush toy 100. These can be used by the control module 120 to determine whether the plush toy is being moved in conjunction with a predetermined exercise or other cognitive movement routine as described subsequently in greater detail. The position module 130 may also include a global positioning system (GPS) transceiver that can intermittently or continuously monitor the location of the plush toy 100.

The management system 110 also includes a proximity module 170 having one or more proximity sensors 172 in communication with the control module 120 that monitor the closeness of the individual to the plush toy 100. The proximity sensors 172 of the proximity module 170 may include, for example, infrared, ultrasonic, light, pressure, and/or touch sensors which are configured to monitor the proximity of the individual's body, such as one or more of the individual's hands, to the plush toy 100. The control module may use these sensors to determine whether the plush toy 100 is being contacted in conjunction with a predetermined exercise or other cognitive movement routine as described subsequently in greater detail.

In some embodiments, the management system 110 optionally includes a biometric module 140, having one or more biometric sensors 142 configured to monitor one or more predetermined biometric characteristics of the individual. For example, in some configurations, the biometric module 140 may monitor the temperature of an individual holding the plush toy 100. In some configurations, the biometric module 140 may monitor the heart rate of the individual. The biometric sensors 142 of the biometric module 140 may be used to monitor biometric characteristics during an exercise routine or under other circumstances as may be desired when in the possession of the individual.

The management system 110 includes an audio/video (A/V) module 150 in communication with the control module 120 to provide outputs to the user and allow inputs from caregivers. The inputs may be stored in the plush toy 100 and presented to the individual at predetermined times. The output request may be presented to the individual in any suitable manner, but generally presented audibly, such as via a speaker, visually, such as via a display screen and combinations thereof. The A/V module 150 may also be used to monitor the status of the user. In some embodiments, the A/V module 150 includes one or more of a microphone, camera, or speaker.

The A/V module 150 is thus configured to communicate with the user via a speaker or other output device for interaction with the individual, for example, to provide instructions for carrying out an exercise (movement) routine or to remind the individual of an important activity, such as remember to eat, drink water or take medicine at a time programmed into the control module 120. In some configurations, the audio/video module 150 may include an input to allow messages to be recorded to memory, such as the memory of the control module 120. Such messages can be recorded by family to allow more meaningful interaction and/or to stimulate the individual to be more responsive to instructions or reminders being delivered through a loved one's voice. Other pre-recorded messages can give caregivers and/or individuals important information about the individual and/or family members such as birthday dates and other special dates.

The management system 110 may also optionally include a physical stimulation module 160 in communication with the control module 120 to arouse the individual as their activity decreases. Vibrating stimulation motors are located in one or more of the arms 102, legs 104, head 106, and body 108 of the plush toy 100. In some embodiments, the physical stimulation may be provided in conjunction with A/V stimulation from the A/V module 150. In one embodiment, the physical stimulation may be provided simultaneously with the A/V stimulation.

The management system 110 further includes a communication module 180 in communication with the control module 120. The communication module 180 may be configured to communicate with one or more of the individual, caregivers, remote monitoring systems, medical professionals, and/or other persons or systems involved in the care of the individual. In some configurations, the communications module 180 may include wireless connectivity, such as Bluetooth, cellular, or wireless internet connections to transfer information between the plush toy 100 and a person or system to monitor the information and/or communicate directly with the caregiver of the individual. In some configurations, the communications module 180 may include wired connectivity via a local area network (LAN), USB port, Firewire or other wired connection.

In some configurations, the communications module 180 allows for retrieval of data collected by the position module 130, proximity module 170, and/or biometric module 140. The data may be transferred via the wired or wireless connectivity. Alternatively, the data may be transferred audibly via the speaker or displayed on a display screen or monitor.

It will be appreciated that the functions described above pertaining to individual modules when implemented may result in fewer or more total modules and/or may separate or further combine the functions. Each of the modules may comprise a general-purpose computer (memory and processor) programed to carry out the functions of the module.

The plush toy 100 may simultaneously provide comfort and/or entertainment to the individual while additionally assisting the individual and caregivers with receiving and providing care. Regular movement has been shown to slow mental decline and improve the quality of life in individuals with dementia. However, individuals with dementia are often forgetful of daily tasks and may not perform exercises or other movement routines fully, or forget to perform them entirely. Individuals with memory deficiencies also may often forget to drink. Dehydration causes a plethora of unwanted symptoms and signs in persons with dementia.

Instructions may be stored in the memory of the control module 120 of the plush toy 100 which allow the plush toy 100 to assist the individual with various tasks, including regular exercise. The cognitive aid device 10 is arranged and configured to execute the instructions, and executing the instruction includes the cognitive aid device 10 prompting an individual using the cognitive aid to perform an exercise or other cognitive movement routine described by the cognitive aid device 10, monitoring the individual with at least one of the position module 130, the proximity module 170, and the A/V module 150, processing data received from the at least one of the position module 130, the proximity module 170, and the A/V module 150 to confirm if and when the individual performs the exercise or other cognitive movement routine, and providing responsive stimulus to the individual indicating successful completion of the exercise or other cognitive movement routine or further prompting the individual to perform the exercise or other cognitive movement routine. Confirming whether the individual has performed the exercise or other cognitive movement routine may include analyzing the quality of the exercise or other cognitive movement routine actually performed. This analyzing may incorporated artificial intelligence, review by a care provider, or both.

In one embodiment, monitoring the individual with at least one of the position module 130, the proximity module 170, and the A/V module 150 includes monitoring the individual with at least two of the position module 130, the proximity module 170, and the A/V module 150, and processing the data received from the at least one of the position module 130, the proximity module 170, and the A/V module 150 to confirm if and when the individual performs the exercise or other cognitive movement routine includes processing the data received from the at least two of the position module 130, the proximity module 170, and the A/V module 150 to confirm if and when the individual performs the exercise or other cognitive movement routine.

In a further embodiment, monitoring the individual with at least one of the position module 130, the proximity module 170, and the A/V module 150 includes monitoring the individual with each of the position module 130, the proximity module 170, and the A/V module 150, and processing the data received from the at least one of the position module 130, the proximity module 170, and the A/V module 150 to confirm if and when the individual performs the exercise or other cognitive movement routine includes processing the data received from each of the position module 130, the proximity module 170, and the A/V module 150 to confirm if and when the individual performs the exercise or other cognitive movement routine.

In one configuration, the audio instructions may be input into the memory of the plush toy 100 and played through the speaker to the person at a predetermined time. Similar or reoccurring instructions may be repeatedly played to the individual to assist them in performing repetitive tasks. The control module 120 might, for example, keep a timer on how long the individual is sitting and remind that person to get up and take the toy 100 for a walk. Additionally, the interval of limited exercise or other movements throughout the day is possible. In one configuration, instructions assisting the individual with a regular movement routine are played at predetermined times during the day. The instructions may be played one or more times during a day and repeated at the same or different times on different days. Reminder instructions to drink liquid may occur at appropriate intervals throughout the day. In order to provide a more familiar and comforting interaction for the individual the instructions may be recorded by a close friend or relative.

The plush toy 100 may be configured to determine whether the individual has performed the instructions. In some configurations, the position sensors 132 of the position module 130 and/or the proximity sensors 172 proximity module 170 detect the movements performed by the individual in response to the instructions. For example, if the individual performs a requested task in which the position module 130 determines movement as instructed beyond a predetermined threshold and/or for a predetermined number of repetitions, the control module 120 may play a prerecorded supportive message congratulating the individual for successfully performing their task. If the individual performs the task or movement as instructed below a predetermined threshold, the control module 120 might play a prerecorded message encouraging the individual to do more, such as increase the range of motion or speed of the exercise. For example, the prerecorded message may encourage the individual to lift the plush toy 100 above their head. Alternatively, the prerecorded message may encourage the individual to rotate the plush toy. For example, "turn me clockwise" or "turn me counterclockwise". The plush toy 100 will, upon activation, ask the individual to perform body movements that are scaled to that individual's level of function. For example, if the individual is tethered to a wheelchair, the movements will be all related to the upper extremity and cervical spine. The complexity of the movements can be individualized with a direct relationship to the stage of the level of dementia exhibited by and/or the physical capabilities of, the individual.

Exemplary embodiments can advantageously be used to stimulate and monitor memory and emotion in addition to movement. An individual's verbal responses may be monitored in response to questions designed to elicit a response to stimulate memory and/or emotion. In some embodiments, the monitoring may be to assess whether any verbal response is provided at all, while in other embodiments, the monitoring may be to assess the accuracy of the verbal response. It will be appreciated that the instructions provided by the plush toy 100 to the user may be generated automatically from a bank of commands stored in the memory associated with the control module 120. In other cases, the instructions may be given via a remote microphone or other remote input device from, for example, a caretaker observing the individual. With this remote input, the caretaker can adjust the interactions to address any immediate needs of the user. By way of example, a caregiver may observe a behavior of the individual at give a specific instruction through the plush toy 100 in response.

In either case, as with the complexity of movement and other instructions, the order and relative number of instructions relating to each of movement, memory, and emotion may be programmed on an individualized basis on with a direct relationship to the stage of the level of dementia exhibited by and/or the physical capabilities of, the individual. Thus, for example, the instructions for one user might be weighted more heavily in favor of emotional questions instead of memory or movement. Additionally, the plush toy 100 may be programmed with respect to the number of times a particular instruction or activity is repeated as well as the total amount of time the interaction with the plush toy 100 has lasted in order to provide the user with a rest period of a predetermined length following the stimulation. In one embodiment, instructions may be groups in sets of any appropriate size, including but not limited to, sets of between 10 to 50, instructions, alternatively between 10 to 20 instructions, alternatively between 15 to 25 instructions, alternatively between 20 to 30 instructions, alternatively between 25 to 35 instructions, alternatively between 30 to 40 instructions, alternatively between 35 to 45 instructions, alternatively between 40 to 50 instructions. In one embodiment, each set of instructions includes instructions relating to each of movement, memory, and emotion. In a further embodiment, instructions in a set may be divided into subsets of 2 to 5 instructions to reduce likelihood of boredom or distraction in the individual. In a further embodiment, each set or subset may commence with an instruction related to movement.

In one embodiment, there is a series of comments recorded specifically for individual clients that address reasoning, emotional and physical stimulus for that person. The three items (reasoning emotional and physical stimuli may be equally distributed (for example, 5 questions for each area) or not equal in distribution (for example 8 questions in reasoning and 3 questions in emotional and physical). The ratio of questions/commands are based on the specific deficit encountered with a particular memory deficient individual. The reasoning questions have to do with functions like adding sums or dividing sums and even multiplying sums of numbers. The emotional sector deals with overt expressions of caring for the plush toy 100. Examples of this activity is hugging the plush toy 100, putting the plush toy to sleep and rubbing the head of the plush toy 100. The reasoning segment is the cognitive function. The physical is the psychomotor movements and the affective is the emotional component.

The plush toy 100 may simultaneously monitor the biometric and condition of the individual as the individual performs the task. The plush toy 100 may additionally be configured to monitor the biometrics of the individual at other times in addition to during the performance of the tasks. In some configurations, the plush toy 100 may monitor the heart rate, oxygen level, breathing rate, and/or temperature of the individual.

The plush toy 100 may additionally communicate the biometrics and/or performance of the individual to an external monitor, such as a family member, nurse, doctor, or other caregiver. The plush toy 100 may additionally communicate the biometrics and/or performance of the individual to an electronic monitor for further analysis.

In one embodiment, the plush toy 100 includes arms 102 and legs 104 that swivel, the one or more position sensor 132 includes at least one sensor measuring swiveling of the arms 102 and legs 104, and the instructions include prompting the individual to swivel an arm 102 or a leg 104 and monitoring when the arm 102 or the leg 104 is swiveled.

In another embodiment, the one or more proximity sensor 172 includes at least one sensor disposed in at least one of, alternatively each of or any combinations of, a nose 107, an ear 109, an arm 102, or a leg 104 of the plush toy 100, and the instructions include prompting the individual to touch the at least one of the nose 107, the ear 109, the arm 102, or the leg 104 and monitoring when the at least one of the nose 107, the ear 109, the arm 102, or the leg 104 is touched. It will be appreciated that in some embodiments, the cloth of the shell for the plush toy 100 is touch sensitive. In a further embodiment, the one or more proximity sensor 172 is disposed in the at least one of the nose 107, the ear 109, the arm 102, or the leg 104 of the plush toy 100 along with at least one of a vibrating stimulation motor or a visual stimulation source, such that following a prompt for the individual to touch or manipulate the at least one of the nose 107, the ear 109, the arm 102, or the leg 104 of the plush toy 100, the vibrating stimulation motor or the visual stimulation source would be activated by the control module 120 to provide the responsive stimulus to the individual. Suitable visual stimulation sources include but are not limited to, light emitting diodes, fiber optics, and combinations thereof.

In yet another embodiment, the instructions including prompting the individual to move the plush toy 100 and monitoring when the plush toy 100 is moved.

The instructions may include prompting the individual to take the plush toy 100 for a walk and monitoring when the individual takes the plush toy 100 for the walk. The instructions may further include monitoring at least one of the distance of the walk, speed of the walk, and the duration of the walk.

In one embodiment, a method for assisting an individual with an exercise or other cognitive movement routine includes providing the cognitive aid device 10, prompting the individual using the cognitive aid to perform the exercise or other cognitive movement routine described by the cognitive aid device 10, monitoring the individual with the at least one of the position module 130, the proximity module 170, and the A/V module 150, processing the data received from the at least one of the position module 130, the proximity module 170, and the A/V module 150 to confirm if and when the individual performs the exercise or other cognitive movement routine, and providing the responsive stimulus to the individual indicating successful completion of the exercise or other cognitive movement routine or further prompting the individual to perform the exercise or other cognitive movement routine. Confirming whether the individual has performed the exercise or other cognitive movement routine may include analyzing the quality of the exercise or other cognitive movement routine actually performed. This analyzing may incorporated artificial intelligence, review by a caregiver, or both. The method may further include communicating with an external monitor whether the exercise or other cognitive movement routine has been successfully completed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cognitive aid device, comprising:
a) a shell configured as a plush toy; and
b) a management system located at least partially within the shell, the management system comprising:
   i) a control module including a processor, memory, and instructions encoded in the memory;
   ii) a position module including one or more position sensors in communication with the control module;
   iii) a communication module in communication with the control module;
   iv) a proximity module including one or more proximity sensors in communication with the control module; and
   v) an audio/visual (A/V) module in communication with the control module,
wherein the cognitive aid device is arranged and configured to execute the instructions, and executing the instructions includes the cognitive aid device:
   prompting an individual using the cognitive aid to perform an exercise or other cognitive movement routine described by the cognitive aid device;
   monitoring the individual with at least one of the position module, the proximity module, and the A/V module;
   detecting a level of compliance associated with the performed exercise or other cognitive movement routine of the individual exceeds a predetermined threshold; and
   based on the detected level of compliance, providing responsive stimulus to the individual indicating successful completion of the exercise or other cognitive movement routine or further prompting the individual to perform the exercise or other cognitive movement routine.

2. The cognitive aid device of claim 1, wherein monitoring the individual with at least one of the position module, the proximity module, and the A/V module includes monitoring the individual with at least two of the position module, the proximity module, and the A/V module, and processing the data received from the at least one of the position module, the proximity module, and the A/V module to confirm if and when the individual performs the exercise or other cognitive movement routine includes processing the data received from the at least two of the position module, the proximity module, and the A/V module to confirm if and when the individual performs the exercise or other cognitive movement routine.

3. The cognitive aid device of claim 1, wherein monitoring the individual with at least one of the position module, the proximity module, and the A/V module includes monitoring the individual with each of the position module, the proximity module, and the A/V module, and processing the data received from the at least one of the position module, the proximity module, and the A/V module to confirm if and when the individual performs the exercise or other cognitive movement routine includes processing the data received from each of the position module, the proximity module, and the A/V module to confirm if and when the individual performs the exercise or other cognitive movement routine.

4. The cognitive aid device of claim 1, wherein the management system further comprises a biometric module including one or more biometric sensors in communication with the control module.

5. The cognitive aid device of claim 4, wherein the one or more biometric sensors are configured to measure at least one of a heart rate, an oxygen level, a breathing rate, or a temperature of the individual.

6. The cognitive aid device of claim 1, wherein the plush toy includes arms and legs that swivel, the one or more position sensor includes at least one sensor measuring swiveling of the arms and legs, and the instructions include prompting the individual to swivel an arm or a leg and monitoring when the arm or the leg is swiveled.

7. The cognitive aid device of claim 1, wherein the one or more proximity sensor includes at least one sensor disposed in at least one of a nose, an ear, an arm, or a leg of the plush toy, and the instructions include prompting the individual to touch the at least one of the nose, the ear, the arm, or the leg and monitoring when the at least one of the nose, the ear, the arm, or the leg is touched.

8. The cognitive aid device of claim 7, wherein the one or more proximity sensor is disposed in the at least one of the nose, the ear, the arm, or the leg of the plush toy along with at least one of a vibrating stimulation motor or a visual stimulation source, such that following a prompt for the individual to touch or manipulate the at least one of the nose, the ear, the arm, or the leg of the plush toy, the vibrating stimulation motor or the visual stimulation source would be activated by the control module to provide the responsive stimulus to the individual.

9. The cognitive aid device of claim 1, wherein the instructions including prompting the individual to move the plush toy and monitoring when the plush toy is moved.

10. The cognitive aid device of claim 1, wherein the instructions include prompting the individual to take the plush toy for a walk and monitoring when the individual takes the plush toy for the walk.

11. The cognitive aid device of claim 10 further including monitoring at least one of the distance of the walk, the speed of the walk, and the duration of the walk.

12. The cognitive aid device of claim 1, wherein the one or more position sensors includes a sensor selected from the group consisting of an accelerometer, a pedometer, a magnetometer, a barometer, an altimeter, a gyro meter, and combinations thereof.

13. The cognitive aid device of claim 12, wherein the one or more position sensors includes an accelerometer and a gyro meter.

14. The cognitive aid device of claim 1, wherein the one or more proximity sensors include a sensor selected from the group consisting of an infrared sensor, a light sensor, an ultrasonic sensor, a touch sensor, a pressure sensor, and combinations thereof.

15. The cognitive aid device of claim 1, wherein A/V module comprises an A/V device selected from the group consisting of a speaker, a microphone, a video camera, a display screen, and combinations thereof.

16. A method for assisting an individual with an exercise or other cognitive movement routine comprising:
   a) providing the cognitive aid device of claim 1;
   b) prompting the individual using the cognitive aid to perform the exercise or other cognitive movement routine described by the cognitive aid device;
   c) monitoring the individual with the at least one of the position module, the proximity module, and the A/V module;
   d) detecting a level of compliance associated with the performed exercise or other cognitive movement routine of the individual exceeds a predetermined threshold; and
   e) based on the detected level of compliance, providing the responsive stimulus to the individual indicating successful completion of the exercise or other cognitive movement routine or further prompting the individual to perform the exercise or other cognitive movement routine.

17. The method of claim 16, further comprising communicating with an external monitor whether the exercise or other cognitive movement routine has been successfully completed.

18. The method of claim 16, wherein the one or more proximity sensor includes at least one sensor disposed in at least one of a nose, an ear, an arm, or a leg of the plush toy, prompting the individual includes prompting the individual to touch the at least one of the nose, the ear, the arm, or the leg, and monitoring includes monitoring when the at least one of the nose, the ear, the arm, or the leg is touched.

19. The method of claim 16, wherein prompting the individual includes prompting the individual to move the plush toy, and monitoring includes monitoring when the plush toy is moved.

20. The method of claim 16, wherein prompting the individual includes prompting the individual to take the plush toy for a walk, and monitoring includes monitoring when the individual takes the plush toy for the walk.

* * * * *